July 23, 1957  A. A. MAYS  2,799,928
ELECTRICALLY OPERATED SCISSORS OR SHEARS
Filed Oct. 3, 1956  2 Sheets-Sheet 1

INVENTOR.
ARTRICE A. MAYS.
BY
DES JARDINS & ROBINSON.
HIS ATTORNEYS

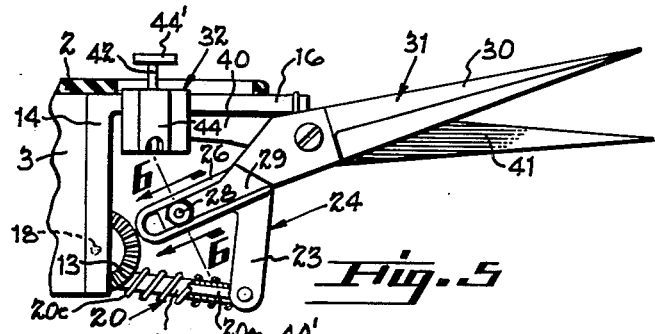
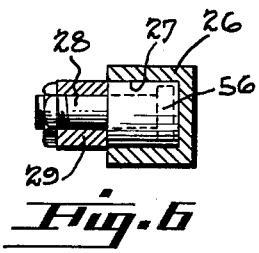
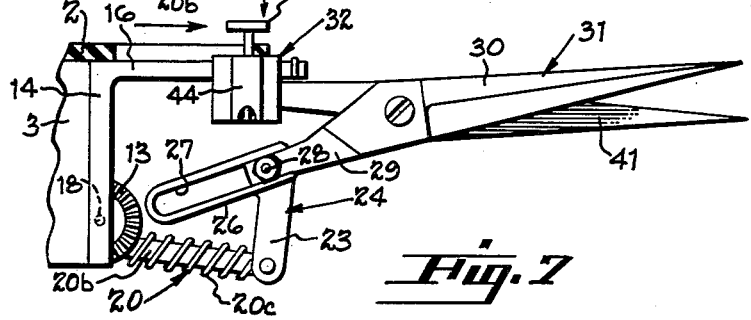
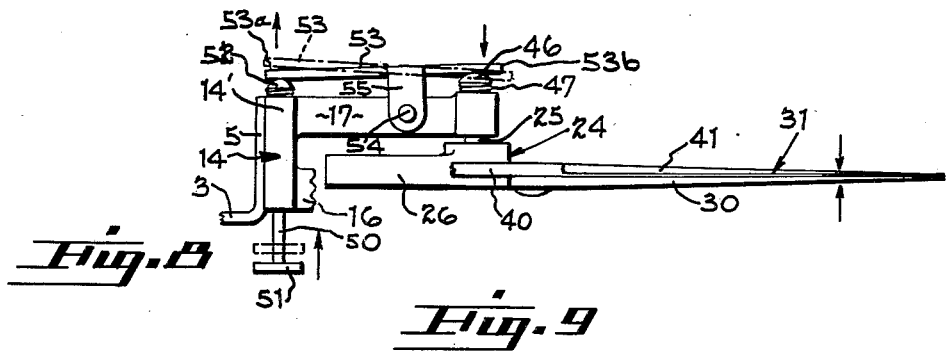
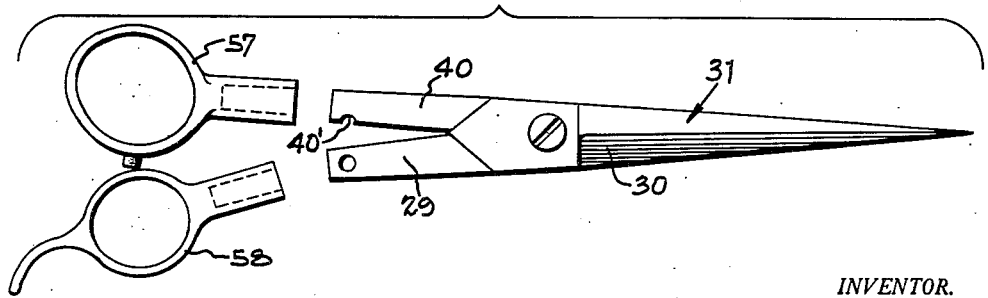
INVENTOR.
ARTRICE A. MAYS.
BY DES JARDINS & ROBINSON.
HIS ATTORNEYS

United States Patent Office 2,799,928
Patented July 23, 1957

2,799,928

ELECTRICALLY OPERATED SCISSORS OR SHEARS

Artrice A. Mays, Norwood, Ohio

Application October 3, 1956, Serial No. 613,620

10 Claims. (Cl. 30—228)

This invention relates to electrically operated scissors or shears, and more particularly pertains to barber scissors or shears which are relatively light in weight and are easily manipulated by hand in various cutting positions while being electrically operated.

Electrically operated scissors or shears heretofore manufactured have been of heavy and bulky construction and used for cutting relatively hard objects, such as hedges and the like. Even for such work they have been cumbersome and unwieldly for being manually held and manipulated in various cutting positions.

Accordingly, one of the main objects of the present invention is electrically operated scissors which are light in weight for being conveniently held in the hand and manipulated to various cutting positions.

Another object of the invention is electrically operated scissors which are simple in construction and efficient in operation.

Another object of the invention is electrically operated scissors in which all driving mechanism is compactly mounted in the casing handle.

Another object of the invention is electrically operated scissors simulating hand operation.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification, in which:

Fig. 5 is a detailed view showing one extreme adjusted position for full cutting.

Fig. 6 is a cross sectional view on line 6—6 of Fig. 5 looking in the direction of the arrows.

Fig. 7 is a detailed view showing the other extreme adjusted position for short cutting.

Fig. 8 is a detailed view.

Fig. 9 is a view of the scissors and detachable handles.

Figure 1:
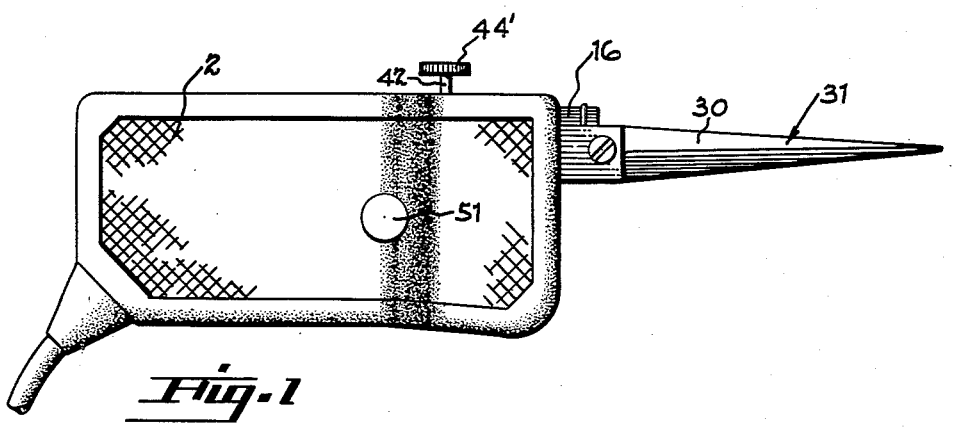
Fig. 1 is a side elevation of an embodiment of the invention.
Figure 2:
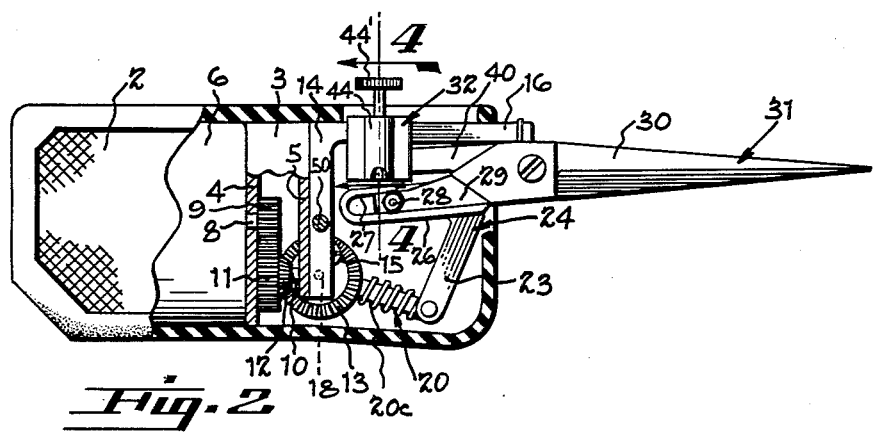
Fig. 2 is a side elevation similar to Fig. 1 with a part of the casing removed.
Figure 3:
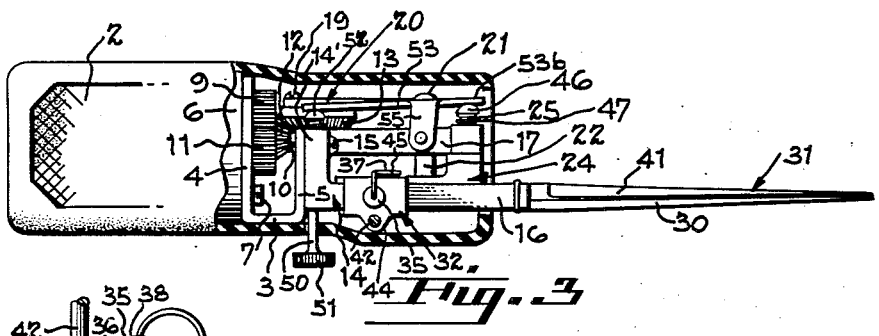
Fig. 3 is a top plan view with a part of the casing removed.
Figure 4:
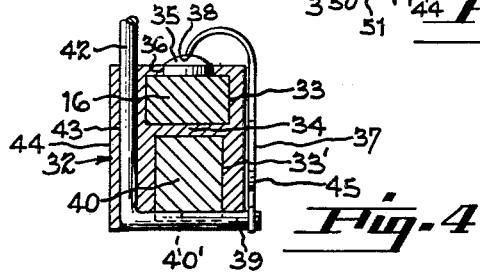
Fig. 4 is a sectional view on line 4—4 of Fig. 2 looking in the direction of the arrows.

Referring specifically to the drawing in which like numerals designate like parts, numeral 2 is a housing or casing member disposed about a mounting for a pair of scissors or shears and their operating mechanism, said housing serving as a handle for the shears.

The mounting in the casing 2 comprises a plate 3 having two of its opposite ends bent into flanges 4 and 5. A conventional electric motor 6 is clamped by clamp screws 7 to the end flange 4 and has the end of its driving shaft 8 projecting therethrough on which is fixed a drive gear wheel 9. The opposite ends of the drive shaft 10 are journaled in these flanges 4 and 5, and said shaft carries a gear wheel 11, fixed to one end, disposed in position to mesh with the gear wheel 9 and another gear wheel 12 on its opposite end for meshing with a gear wheel 13 hereinafter described. The gear wheel 12 is beveled.

A fitting unit 14 is secured to the end of flange 5 by clamp screws 15 projecting through head 14' which abuts the flange 5. Said fitting 14 is provided with a pair of projecting arms 16 and 17 vertically spaced apart. The gear wheel 13 is journaled on a shaft 18 mounted on the fitting unit 14. The gear teeth are on a side face of the wheel 13 next to the beveled gear 12 in position to mesh therewith, and the opposite face of this wheel has a wrist pin 19, eccentrically disposed, for being connected with a pitman rod 20 whose opposite end is connected by a screw 21 to an extension 22 from one arm 23 of the lever 24. This lever 24 is pivoted to the lower arm 17 of the fitting unit 14 by a pin 25 slidably mounted in said arm. The other arm 26 of the lever 24 has an open elongated U-shaped slot 27 in one face for a sliding fit with the wrist pin 28 on the end 29 of blade 30 of scissors 31.

A member 32, provided with two channels 33 and 33' separated by a web 34, is mounted upon the upper arm 16, with said arm 16 projecting through the channel 33. This arm 16 is rectangular in cross section, and the channel 33 is of like conformation. This member 32 is slidably mounted on the arm 16 and is frictionally held in adjusted position thereon by a plug 35 fitting a recess 36 through the wall of member 32 and adapted to frictionally engage the top side of the arm, the plug being yieldably held against the arm by a spring 37 having one end fitting a socket 38 in the top of said plug and its opposite end connected to the end of pin 39 which locks the end 40 of the other blade 41 of the scissors in channel 33'. The pin 39 extends transversely of the bottom wall of the channel 33' and opens into said channel so that it can be engaged with a notch 40' in the end 40 of blade 41. This pin 39 can be raised or lowered by the vertical extension 42 slidably fitted in the vertical recess 43 of an embossment 44 on the side of member 32 and carrying a button 44' on its top end. The loop 45 of the spring biases the plug 35 in frictional contact with the arm 16 and the transverse pin 39 in locking engagement with the end of the blade 41 that is inserted in the channel 33'.

The pivot pin 25 for the lever 24 has a head portion 46 extending a substantial distance from the side of the arm 16 opposite to the side on which said lever 24 is mounted. A compression spring 47 is interposed between the head 46 and the adjacent side of the arm 16 to bias the lever against the side of the arm.

A rod 50 extends through the head 14' of the fitting 14, parallel with pivot pin 25, having a knob 51 on one end and a button 52 on its opposite end. A lever 53 is pivoted at 54 to arm 17 by a pair of lugs 55 extending from the opposite side edges of said lever 53. One end 53a of the lever 53 is adjacent the button 52 on rod 50 and the opposite end 53b of the lever 53 is adjacent the head 46 of the pivot pin 25. This provides means for temporarily causing the shearing blades to be more tightly brought together than in their normal position. By manually pressing the rod 50 against the lever 53, the cutting edges of the scissors are temporarily pressed more tightly together.

The member 32 on the top arm 16 can be readily adjusted lengthwise by reason of the frictional contact of the plug 35 so as to effect full open position of the shears as shown in Fig. 5 or for less than full open position as shown in Fig. 7 for snipping.

The piston 20 is preferably composed of sections 20a and 20b slidably connected together by the rod portion of section 20a fitting within the bore of tubular section 20b. A coiled 20C is disposed about the sections with one terminal end thereof fixed to one section 20a and its opposite terminal end fixed to the other section. This spring 20c biases the sections normally in non-extended position but will permit lengthwise extension upon the pull of the eccentric should there be an obstruction between the blades.

While any wrist pin 28 may be used on the end 29 of blades 30 for reciprocating it relatively to the other blade by the U-slot 27 in the lever 24, this pin preferably has a roller 56 (Fig. 6) for trackage in U-slot.

The scissors used may be a conventional pair of hand operated ones with their handles 57 and 58 (Fig. 9) detachably connected so that the same may be selectively used manually or electrically operated by detaching the handles and filling them in the electrically operated device as above described.

I am aware that there may be various changes in details of construction without departing from the spirit of the invention, and, therefore, I claim my invention broadly as indicated by the appended claims.

Having thus described my invention, what I claim as new and useful and desire to secure by United States Letters Patent is:

1. Electrically operated scissors comprising a mounting for an electric motor, the ends of a pair of scissors and the driving connection between said scissors and the motor, said mounting including a slidable member to which one of the ends of the scissors is directly attached for selecting a longer or shorter cut and a pivoted lever having a trackway to which the other arm of the scissors is connected for being moved relatively to that end which is fitted to said slidable member.

2. Electrically operated scissors comprising a mounting for an electric motor, the ends of a pair of scissors, and the driving connection between said scissors, said mounting comprising a pair of arms to which the arms of the scissors are connected, a member adjustably secured to one of the arms of the mounting and having means for detachably connecting directly thereto one of the arms of the scissors thereto, and a lever pivoted to the other arm of the mounting provided with a trackway connecting the other arm of the scissors, and a driving means for the lever to reciprocate one of the arms of the scissors relatively to the other arm of the scissors.

3. The electrically operated scissors of claim 2 in which the member which is adjustably secured to one of the arms of the mounting is frictionally held in adjustable position.

4. Electrically operated scissors comprising a pair of scissors, an electric motor for operating the scissors, a plate having a flange end to which the motor is attached, a drive shaft mounted on the plate connected with the motor shaft, a fitting fixed to the opposite end of the plate and provided with a pair of arms, a member provided with one channel for being slidably mounted upon one of the arms of the fitting and another channel in which one of the arms of the pair of scissors is secured, a lever pivoted to the other arm of the fitting and provided with a trackway for connecting the other arm of the scissors, and means for connecting the lever to the drive shaft.

5. The electrically operated scissors of claim 4 having a spring biased means for securing the arm of the scissors in the channel member.

6. The electrically operated scissors of claim 5 including means for moving the pivoted lever to increase the cutting pressure of the scissors.

7. Electrically operated scissors comprising a pair of scissors, an electric motor for operating the scissors, a plate to which the motor is attached, a drive shaft mounted on the plate connected with the motor shaft, a fitting fixed to the plate provided with a pair of arms, a member slidably mounted upon one of the arms of said fitting and to which one of the arms of the scissors is secured, a lever pivoted to the other arm of the fitting and provided with a trackway for connecting the other arm of the scissors, and means for connecting the lever to the drive shaft.

8. The electrically operated scissors of claim 7 having a spring biased means for securing the arm of the scissors to the arm of the fitting.

9. The electrically operated scissors of claim 7 including means for increasing the cutting pressure of the scissors.

10. The electrically operated scissors of claim 8 in which the last mentioned means is manually operated.

References Cited in the file of this patent

UNITED STATES PATENTS

| | | |
|---|---|---|
| 1,129,684 | Jones | Feb. 23, 1915 |
| 1,642,259 | Morse | Sept. 13, 1927 |
| 2,189,791 | Gray | Feb. 13, 1940 |
| 2,348,895 | Gaudio | May 16, 1944 |
| 2,426,459 | Landen | Aug. 26, 1947 |
| 2,621,404 | Koons | Dec. 16, 1952 |

FOREIGN PATENTS

| | | |
|---|---|---|
| 931,394 | Germany | Aug. 8, 1955 |